United States Patent [19]

Jenkinson

[11] 4,079,353

[45] Mar. 14, 1978

[54] OFFSHORE SEISMIC SURVEYING TECHNIQUE

[75] Inventor: William D. Jenkinson, Houston, Tex.

[73] Assignee: Texaco Inc., New York, N.Y.

[21] Appl. No.: 657,421

[22] Filed: Feb. 12, 1976

[51] Int. Cl.$^2$ .......................... G01V 1/28; G01V 1/38
[52] U.S. Cl. ............................ 340/7 R; 340/15.5 MC
[58] Field of Search ........................ 340/7 R, 15.5 MC

[56] References Cited

U.S. PATENT DOCUMENTS

| | | | |
|---|---|---|---|
| 2,321,450 | 6/1943 | Athy et al. | 340/15.5 MC |
| 2,503,904 | 4/1956 | Dahm | 340/15.5 MC |
| 3,133,262 | 5/1964 | Strange | 340/7 R |
| 3,274,608 | 9/1966 | Ewing et al. | 340/7 R |
| 3,379,273 | 4/1968 | Chelminski | 340/7 R |
| 3,613,071 | 10/1971 | Quay | 340/15.5 MC |
| 3,786,408 | 1/1974 | Jenkinson et al. | 340/7 R |
| 3,934,220 | 1/1976 | Davis | 340/15.5 MC |

OTHER PUBLICATIONS

Hastrup, "The Influence of a Low Velocity Layer on the Reflectivity of the Sea Floor," 5/15/66, pp. 1-37, Technical Report 61, NATO.

*Primary Examiner*—Nelson Moskowitz
*Attorney, Agent, or Firm*—Carl G. Ries; Thomas H. Whaley; William J. Beard

[57] ABSTRACT

A method of offshore seismic surveying for obtaining data in areas with gassy unconsolidated sedimentation is disclosed. A shallow, or high resolution, seismic survey is performed to map acoustic properties of the water bottom and distinguish between slab areas of the gassy sedimentation, which have relatively good acoustic impedance matching with water bottoms, and scar areas of the gassy sedimentation, characterized by poor impedance matching, giving rise to water bottom multiples. After the slab and scar areas are mapped, conventional seismic profiles may be obtained in the slab zones. For surveying the scar zones, a source vessel is located over a slab zone to emit seismic energy waves, while a second vessel, which is moved over the scar zones, senses the response of the submerged formations. Either refraction or reflection shooting may be performed with the source vessel over the slab zone and the second vessel over the scar zone.

16 Claims, 11 Drawing Figures

DEPTH MODEL

*FIGURES SHOW INTERVAL VELOCITIES*

Fig. 10B

TIME MODEL

*FIGURES SHOW AVERAGE VELOCITIES*

OFFSHORE SEISMIC SURVEYING TECHNIQUE

BACKGROUND OF THE INVENTION:

1. Field of Invention:

The present invention relates to offshore seismic surveying.

2. Description of the Prior Art:

In offshore seismic surveying, particularly in areas near river deltas, portions of the data obtained are often of very low quality. These low quality data typically range from "non-useable" data, termed NU data in the art, where the survey data obtained are not useable for analysis, to "no record" data, known as NR data, where no meaningful seismic data are obtained. One of the main reasons for this phenomenon is that river delta regions typically contain massive deposits of unconsolidated, recent sediments from the river, with the sediments usually containing gas-filled vesicles. Certain of these gassy sediment regions, known as scar zones, form a virtually acoustically opaque layer to reflection seismic surveying, precluding meaningful surveying and analysis of seismic data for regions which are likely to be of interest in locating hydrocarbon deposits.

SUMMARY OF THE INVENTION:

Briefly, the present invention provides a new and improved method of offshore seismic surveying to obtain seismic data from formations beneath gassy unconsolidated sedimentation on the floor of a body of water.

The gassy sedimentation areas can be categorized into two types or zones: slab zones and scar zones. Scar zones are those which exist where the upper layer of unconsolidated mud has slid down slope as a mud flow. Scar zones have poor acoustic impedance matching characteristics with water and thus give rise to undesirable reflections, known in the art as "multiples". Slab zones, in contrast, have relatively good impedance matching with water and are relatively permeable by acoustic energy waves.

Although scar zones are virtually impermeable to downwardly travelling seismic energy due to the acoustic impedance mismatch with water, it has been found with the present invention that scar zones permit meaningful seismic signals to travel upwardly therethrough where the seismic signals are emitted from a source over a portion of the body of water having a slab zone floor.

Seismic energy waves are emitted into the body of water and a high resolution seismic survey is conducted to locate the scar zones, and also the slab zones on the floor capable of transmitting seismic energy waves downwardly therethrough. A seismic source is then located over one of the slab zones, while seismic recording instrumentation is located on selected or preferred profiles. Seismic energy waves are emitted from the source over the slab zone and the response of formations beneath the scar zone sensed by the recording instrumentation so that data are obtained from formations beneath the scar or gassy zones.

Seismic surveys performed with the seismic source over the slab zone and recording instrumentation over the scar zone may be either reflection or refraction seismic surveys. Further, where slab zones located are large enough in extent, conventional reflection seismic surveys may be conducted over such slab zones.

Figure 1:
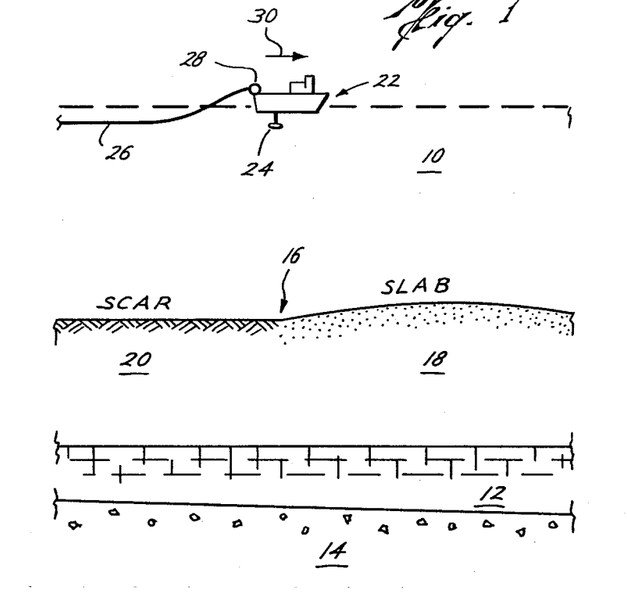
FIG. 1 is an elevation view, partly in cross-section of a seismic survey vessel performing a high resolution seismic survey over a portion of the floor of a body of water.

DESCRIPTION OF THE PREFERRED EMBODIMENT:

In the drawings, a cross-sectional view of a body of water 10 and submerged formations 12 and 14 beneath a floor 16 of the body of water are shown. The floor 16 of the body of water is formed from a massive deposit of unconsolidated, recent sediment typically containing gas filled vesicles. These recent sediments are deposited by rivers and commonly occur in delta regions of rivers.

A first area 18 of the floor 16 above the formation 12 represents an area known in the art as a slab zone. These slab zones on the floor of bodies of water have good acoustic impedance matching with the acoustic impedance of water and are relatively permeable to seismic energy waves. In slab zones, penetration of seismic signals for two-way travel times of up to six seconds are typically obtained.

A second area 20 of the floor 16 represents an area known in the art as a scar zone, a relatively hummocky water bottom surface adjacent the slab zone 18. Scar zones are typically found where the upper layer of unconsolidated mud has slid down slope as a mud flow. Scar zones give rise to undesirable "multiples" in marine seismic surveys, due to to the acoustic impedance mismatch between the water 10 and floor 16, so that the scar zone 20 is often virtually opaque to seismic energy waves. Due to the impedance mismatch, results obtained from conventional seismic profiling over such a scar zone are generally quite poor and range from "non-useable" data, or NU as termed in the art, to even lower quality "no record", or NR as termed in the art.

A seismic survey vessel 22, shown in enlarged size with respect to the body of water 10 and formations 12 and 14 in order to more clearly set forth the structure thereof, has a seismic source 24 therewith for emitting acoustic or seismic energy waves into the body of water 10 and the floor 16. The vessel 22 further has a marine seismic exploration or sensing cable 26 which contains therein hydrophones or seismic detectors to sense the response of the submerged formations 12 and 14 to the seismic energy waves from the source 24. As is conventional, the cable 26 is stored on a reel 28 of the vessel 22 when not in use, and is deployed rearwardly from the vessel 22 for seismic exploration along a seismic line of profile indicated by an arrow 30.

As will be understood by those in the art, in conventional reflection seismic profiling, the seismic cable 26 has mounted therein along the length thereof a number of groups of detectors, typically twenty-four, forty-eight or ninety-six, although other numbers might be used as well. The detector groups are located along the cable 26 at positions spaced at typically three hundred to five hundred feet between detector group centers. Each detector group includes a plurality of seismic detectors or hydrophones connected together in common and having an effective sensing point at the center of the detector group. However, as has been set forth, in conventional reflection seismic profiling scar zone 20 generally greatly distorted the seismic data (NU) or in other cases substantially entirely masked the seismic data (NR).

Thus, in seismic surveying according to the present invention, the floor 16 of the body of water 10 is first mapped by high resolution seismic profiling. The seismic source 24 emits seismic energy waves into the water 10 and a high resolution seismic survey of the conventional type is performed along the line 30. As will be understood by those in the art, during the high resolution seismic survey, detector groups in the cable 26 are more closely spaced to each other, for example one hundred feet between detector group centers, than during conventional reflection seismic profiling. With such closer detector group spacing in high resolution profiling, the received data emphasizes features of the floor 16 of the body of water 10 and relatively shallow seismic events.

Figure 2:
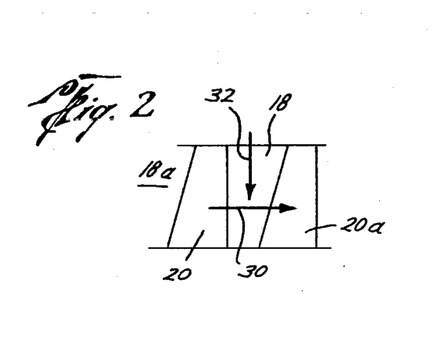
FIGS. 2, 4 and 5 are plan views of the floor of the body of water of FIG. 1 with seismic lines of profile schematically indicated thereon.

High resolution seismic profiling is performed along plural lines parallel with the lines 30 and plural lines of profile as indicated at an arrow 32 (FIG. 2) transverse the line 30 to form a grid or matrix in a seismic survey area of interest. Seismic data obtained during the high resolution seismic survey over the area of interest are processed in accordance with conventional seismic data processing techniques so that the slab and scar zones, as exemplified by slab zones 18 and 18a (FIG. 2) and scar zones 20 and 20a, may be identified and mapped.

Figure 4:
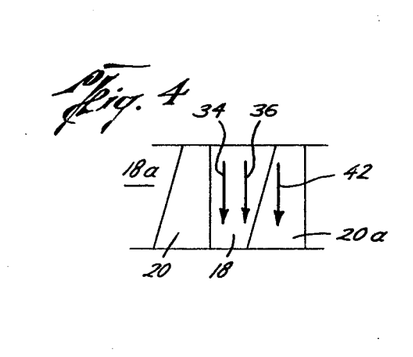
Figure 6:
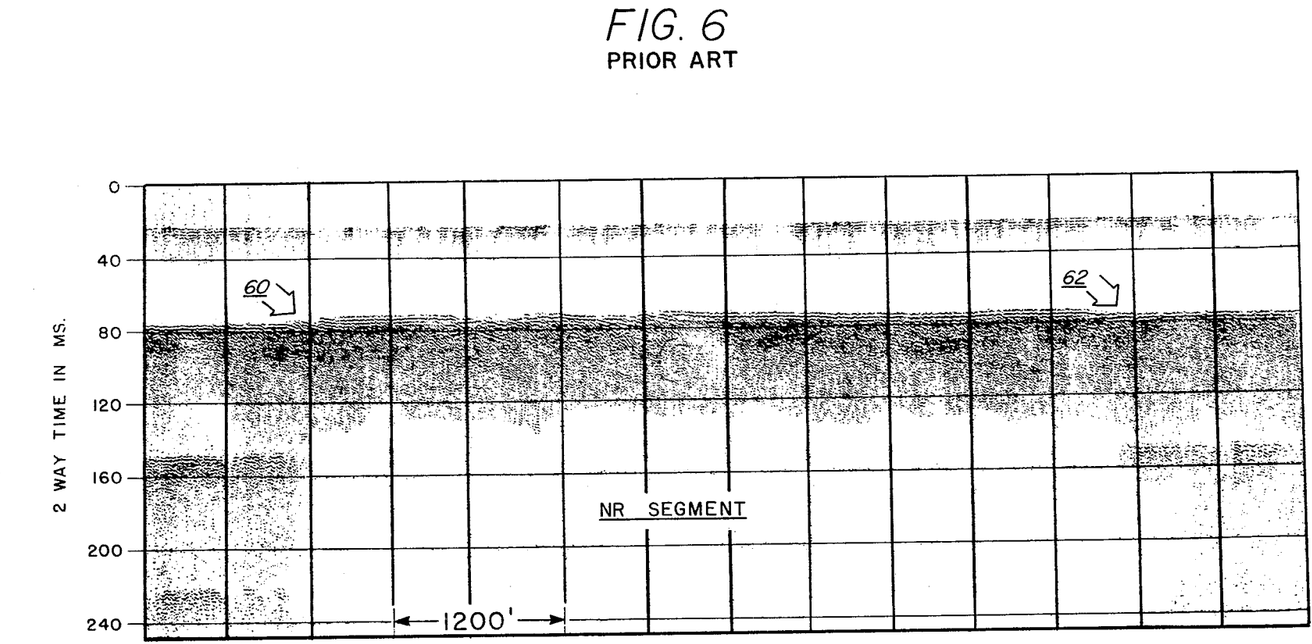
FIG. 6 is a plot of results of high resolution seismic surveying in a river delta region.

FIG. 6 is an example plot of high resolution seismic survey data along a line of profile in a river delta region. An interesting phenomenon, and one which grows in significance as the other data are studied, as will be set forth, appears in the NR segment of the record. Topographic highs in the water bottom have a different acoustic characteristic than the mud on either side. The example in FIG. 6 shows that there is no water bottom multiple associated with the topographic high, indicated by an earlier arrival time, between shot points designated by arrows 60 and 62, whereas the water bottom to the left and right of such arrows has an associated multiple, indicating a higher reflection coefficient at the water-mud interface. The record of FIG. 6 also indicates that the surface of the topographic high is flatter, or smoother than that of the more reflective mud.

Where the results of the high resolution seismic profiling in this manner indicate that the mapped slab zones are sufficient in extent, conventional seismic reflection profiling may be performed along lines of profile thereover, as indicated by arrows 34 and 36 (FIG. 4).

Figure 3:
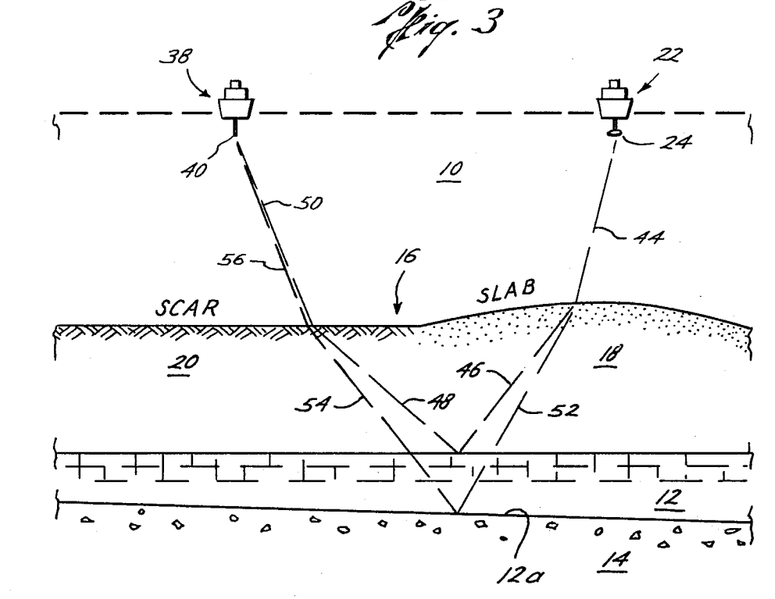
FIG. 3 is an elevation view, partly in cross-section, of reflection seismic surveying according to the present invention.

With the present invention, it has been found that although scar zones such as 20 are virtually impermeable to downwardly travelling seismic energy from a seismic source, such scar zones do permit meaningful seismic events indicating the response of the formations to seismic energy to be sensed with seismic recording instrumentation over the scar zone, provided that such seismic energy waves enter through a slab zone, such as 18 (FIG. 3). The seismic signals travelling upwardly through the scar zone for sensing with seismic recording instrumentation may represent the results of either reflection or refraction seismic surveying, as will be set forth.

Seismic recording instrumentation in the form of a conventional seismic detector cable 40 shown in a front view (FIG. 3) and containing geophones along its length and towed extending rearwardly behind a seismic vessel 38 is located over the scar zone 20. It should be understood that seismic detector cable is preferred as sensing instrumentation, although other seismic recording instrumentation, such as sonobuoys may be used if desired. A seismic energy source, such as the source 24 on the vessel 22 is located over the slab zone 18 and emits seismic energy waves.

In reflection seismic surveying of formations beneath scar zones according to the present invention, the vessel 22 travels along a seismic line of profile, such as the line 34, over the slab zone 18 while the vessel 38 travels along a line parallel with that of the vessel 22, as indicated by an arrow 42 parallel to the arrow 34 (FIG. 4). During such reflection seismic surveying, seismic energy waves from the source 24 travel downwardly as indicated by a line 44 through the water 10 and enter submerged formations through the slab zone 18 where good acoustic coupling is obtained.

Portions of the seismic energy entering through slab 18 travel downwardly and are reflected by the formation 12 as indicated by a line 46. Seismic energy reflected by the formation 12 travels upwardly as indicated by a line 48 passing through the scar zone 20 and travelling upwardly to be sensed by the cable 40, as indicated by line 50.

Similarly, portions of the seismic energy entering through slab zone 18 travel downwardly and are reflected by formation 14 as indicated by a line 52. Seismic energy reflected by formation 14 travels upwardly as indicated by a line 54 passing through the scar zone 20 upwardly to be sensed by the cable 40 as indicated by line 56.

Seismic reflection events sensed in the cable 40 in the foregoing manner from formations beneath the scar zone 20 are then recorded as seismic reflection survey data with conventional seismic data recording equipment on the vessel 38. The recorded reflection seismic data is then processed in the conventional manner and the processing results displayed to provide seismic sections of the formations beneath the scar zone 20.

Figure 7:
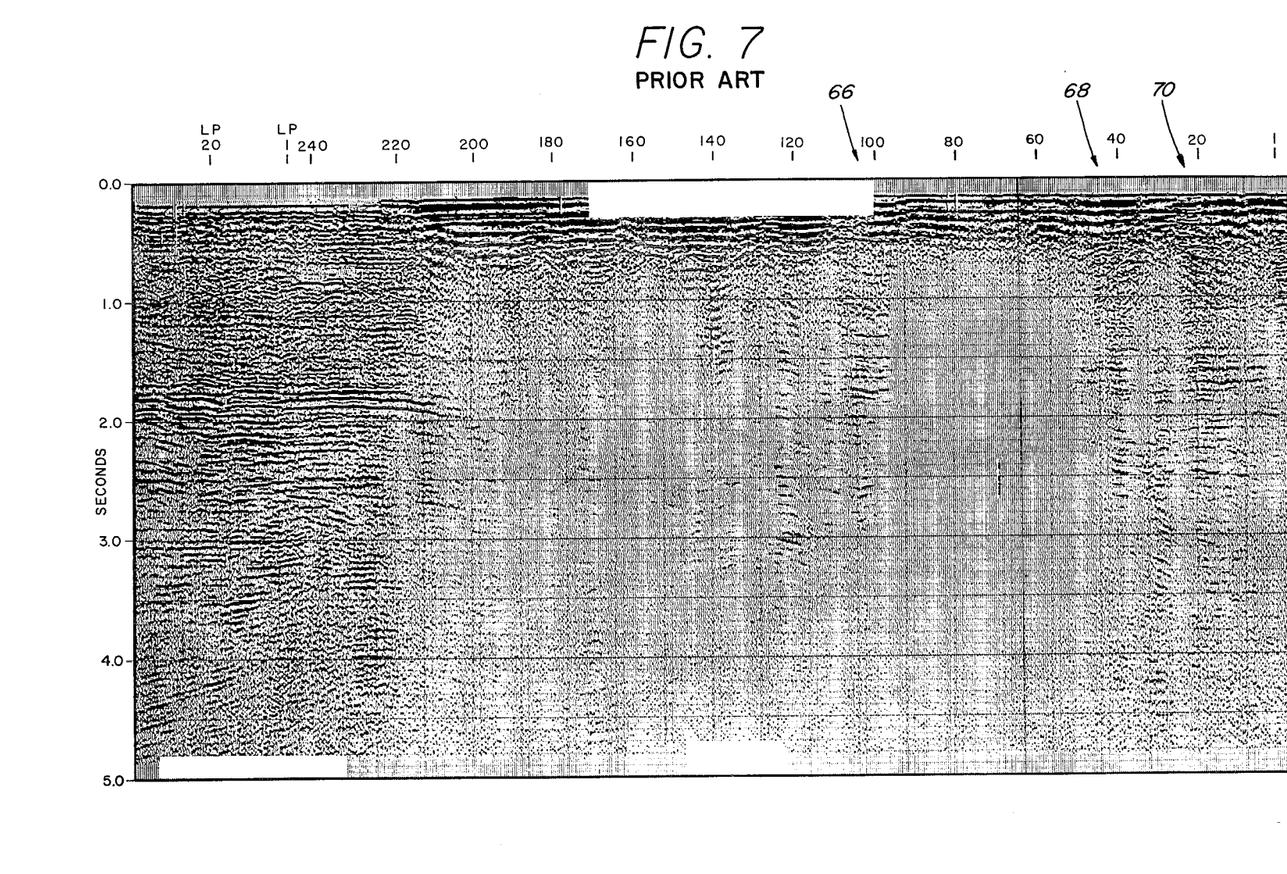
FIG. 7 is a plot of results of conventional seismic surveying in the region where the results of FIG. 6 were obtained.

FIG. 7 is a plot of reflection seismic data in the form of CDP stacked sections. As with the high resolution data record of FIG. 6, good seismic section is obtained in the area to the left of arrow 64. Thereafter to the right, only patches, slab zones or acoustic windows, of good section occur on both displays. Otherwise the data are NU to NR. Examples of acoustic windows occur in the vicinities of arrows 66, 68 and 70.

Comparisons of the data of FIG. 7 with the record of FIG. 6 shows that the windows with good section coincide with the low reflectivity, topographic highs. And the NU to NR zones coincide with the rougher water bottom which also has a noticeable multiple associated with it.

Figure 5:
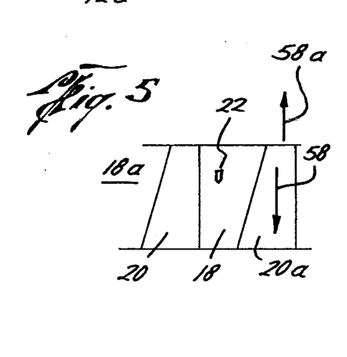

In refraction seismic surveying of formations beneath scar zones according to the present invention, the vessel 22 is fixedly positioned or anchored at a fixed location 5 (FIG. 5) over the slab zone 18. It should be understood that other stationary seismic sources than the vessel may be used to emit seismic energy waves, if desired. The vessel 38 moves away from the vessel 22 over the scar zone 20 as indicated by an arrow 58, and emission of seismic energy from the source 24 on the vessel 22 is controlled by conventional radio remote control circuitry on the vessel 38. As is typical in refraction shooting, the vessel 38 performs refraction surveys in both directions from the stationary vessel 22 as indicated by an additional arrow 58a (FIG. 5).

Emitted seismic energy travels from the source 24 through the slab zone 18 and into the formations therebeneath. Portions of the seismic energy from the source 24 are refracted along each interface between formations, such as an interface 12a (FIG. 3) between formations 12 and 14, and travel along such interfaces.

The recording instrumentation 40 with the vessel 38 senses the arrival of the refraction waves travelling along interfaces between the formations beneath the scar zone 20 and determines the arrival times of refraction head waves as functions of time and distance of the recording instrumentation from the vessel 22. The time-distance functions obtained during refraction surveying are then processed in a manner understood by those in the art to obtain both time and depth models of formations beneath the scar zone 20.

By way of example, two source locations, A and B, were selected over the good data part of the line where the results of FIGS. 6 and 7 were obtained, and at distances of approximately 24,000 and 12,000 feet from the edge of the mud. The sections produced by refraction shooting at these locations are shown in FIG. 8.

Both sections show good first break information over the entire range which includes the mud covered part of the profile. Thus this technique enables acoustic energy to be transmitted into the section where no mud cover exists, to be refracted along various layers, and then to be transmitted back up through the section through the mud cover to the recording vessel. This contrasts strongly to the conventional reflection work where the mud cover defeats conventional reflection profiling.

Figure 8:
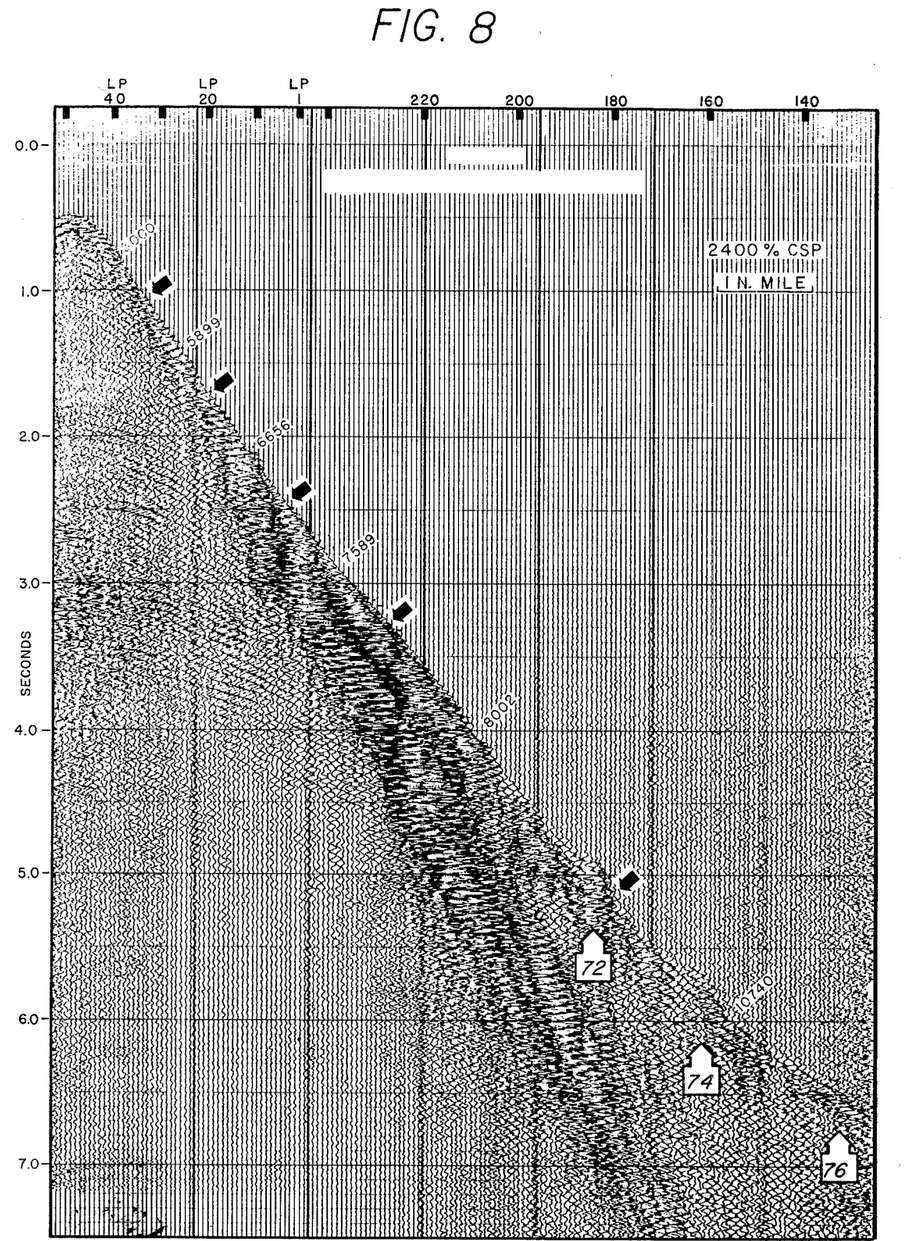
FIG. 8 is a plot of refraction seismic surveying results according to the present invention.

Significant features of these sections are the locales denoted 72, 74 and 76 in FIG. 8. These locales consist of several adjacent traces where the amplitudes of the first arrival signals are considerably larger than those of nearby traces. Also the first arrivals in these locales occur sooner than those on neighboring traces. The locations of these features coincide with the data "windows" observed on the conventional reflection data of FIG. 7 and with the topographic highs on the record of FIG. 6.

Figure 9:
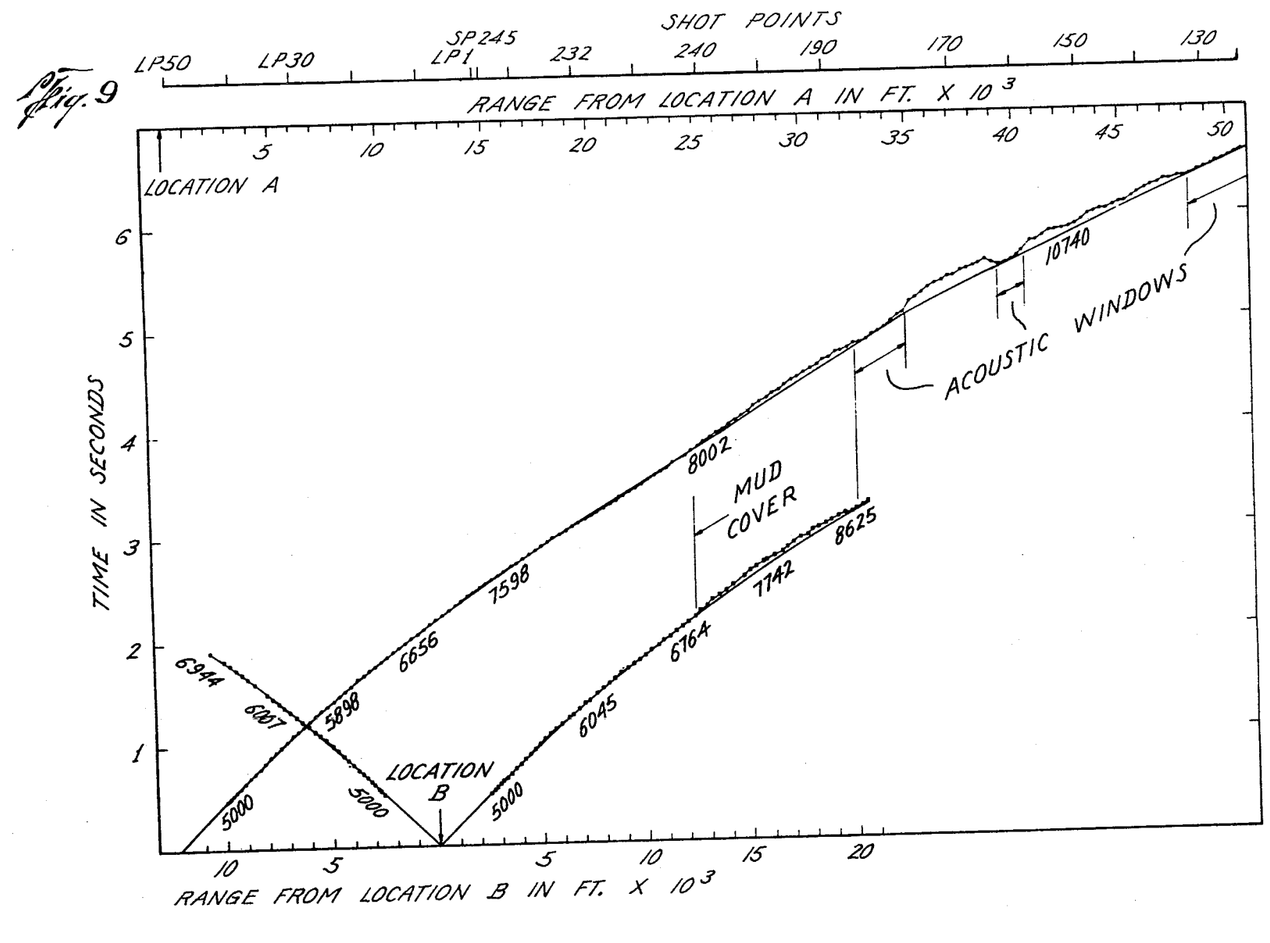
FIG. 9 is an example plot of results from refraction seismic surveying according to the present invention.

First arrival times are plotted as a function of range in FIG. 9. The conventional refraction analysis procedure was applied and the basic velocity functions and mud-delay times were derived. The mud-delay times have magnitudes as great as 0.12 second but they reduce to practically zero in the locales discussed above. These are indicated as acoustic windows in FIG. 9. For the part of the profile where dual coverage exists the accuracy of determination of mud-delay times probably warrants their use for static shifting of the reflection data.

Figure 10A:
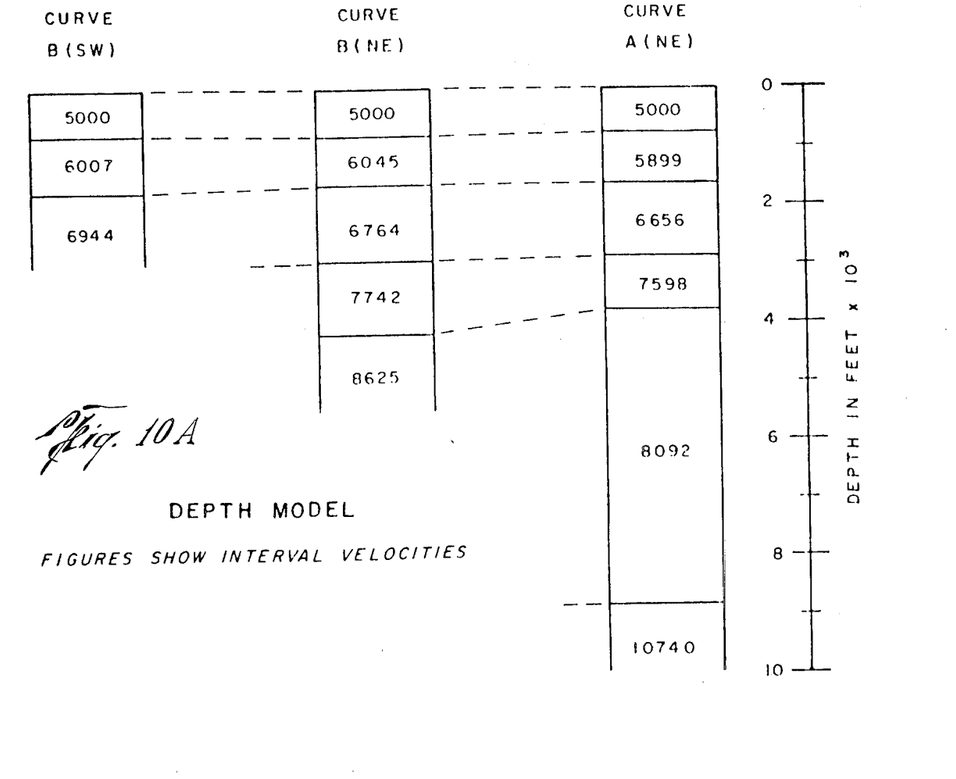
FIGS. 10A and 10B are example plots of time and depth models of submerged formations obtained from survey results of the present invention.
Figure 10B:
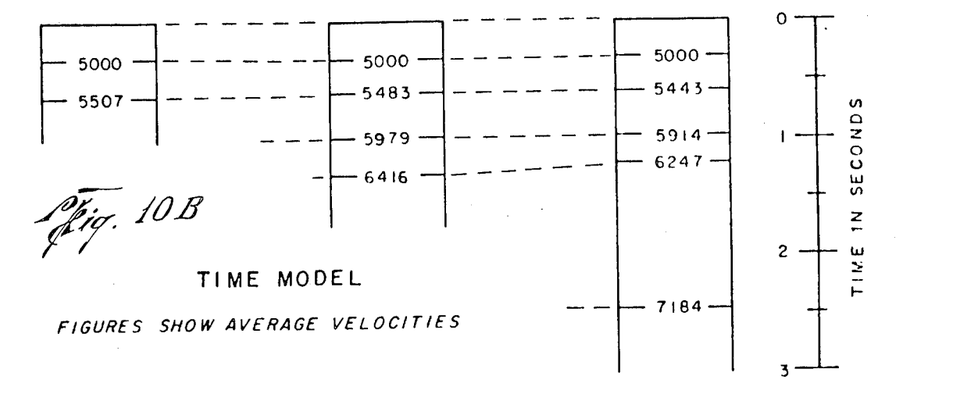

The basic velocity functions were used to construct simple flat layered models for each leg of the t-x curves. A depth versus interval velocity model is shown in FIG. 10A, and a time versus average velocity model is shown in FIG. 10B. These models, which are in good agreement with each other, show a section with progressively increasing velocities to a maximum depth of approximately 9000 feet with a two-way reflection time of nearly 2.5 seconds. The velocity alignment function determined by conventional processing methods over the good seismic section correlates well with these average velocity-time models.

As has been set forth above, the area in which the results set forth above were obtained was a very low quality seismic record area. However, as can be seen from FIGS. 9, 10A and 10B, even in such low quality data areas, a satisfactory seismic model may be obtained for further analysis and exploration by using the techniques of the present invention.

The foregoing disclosure and description of the invention are illustrative and explanatory thereof, and various changes in the size, shape and materials, as well as in the details of the illustrated construction may be made without departing from the spirit of the invention.

I claim:

1. A method of offshore seismic surveying to obtain seismic data from formation submerged beneath horizontally dispersed gassy unconsolidated sedimentation scar zones on the floor of a body of water, comprising the steps of:
   a. emitting seismic energy waves into a body of water;
   b. conducting high resolution seismic surveys to horizontally locate slab zones on said floor of transmitting emitted seismic energy waves downwardly therethrough and to horizontally locate said scar zones on said floor;
   c. locating seismic recording instrumentation over one of said scar zones located on said floor during the high resolution seismic survey;
   d. locating a seismic energy source over one of said slab zones located on said floor;
   e. emitting seismic energy waves from said seismic energy source over said slab zone; and
   f. sensing the response of the formation submerged under said scar zone to the seismic energy emitted over said slab zone with said seismic recording instrumentation whereby data are obtained from formations beneath said scar zones.

2. The method of claim 1, further including the step of:
   conducting seismic surveys over said slab zones located during the step of conducting a high resolution seismic survey.

3. The method of claim 1, wherein said step of emitting seismic energy waves from said source over said slab zone comprises emitting reflection seismic energy waves.

4. The method of claim 3, wherein said step of locating a seismic energy source over one of said slab zones comprises the step of moving a seismic survey vessel having a seismic source therewith over said one of the slab zones.

5. The method of claim 3, wherein said step of locating seismic recording instrumentation comprises moving a seismic recording vessel having seismic recording instrumentation therewith over said one of the scar zones.

6. The method of claim 3, further including the step of:

conducting a reflection seismic survey from the data obtained during said step of sensing the response.

7. The method of claim 3, wherein said step of emitting seismic energy waves from said source over said slab zone includes the step of emitting refraction seismic energy waves from said source over said slab zone.

8. The method of claim 7, further including the step of:

conducting a refraction seismic survey from the data obtained during said step of sensing the response.

9. The method of claim 1, wherein said step of emitting seismic energy waves from said seismic energy source over said slab zone comprises emitting refraction seismic energy waves.

10. The method of claim 9, wherein said step of locating a seismic energy source over one of the slab zones comprises the step of locating a seismic survey vessel having a seismic source therewith at a fixed location over said one of the slab zones.

11. The method of claim 9, wherein said step of locating seismic recording instrumentation comprises moving a seismic recording vessel having seismic recording instrumentation therewith over said one of the scar zones.

12. The method of claim 9, further including the step of:

conducting a refraction seismic survey from the data obtained during said step of sensing the response.

13. The method of claim 1, wherein said step of emitting seismic energy waves into the body of water comprises the step of emitting seismic energy waves from a seismic surveying vessel moving through the body of water.

14. The method of claim 1, wherein said step of locating seismic recording instrumentation comprises moving a seismic recording vessel having seismic recording instrumentation therewith over said one of the scar zones.

15. The method of claim 1, wherein said step of locating a seismic energy source over one of the slab zones comprises the step of locating a seismic survey vessel having a seismic source therewith over said one of the slab zones.

16. The method of claim 1, wherein:
a. said step of locating seismic recording instrumentation comprises locating seismic recording instrumentation over each of the scar zones located on said floor during the high resolution seismic survey; and
b. said step of sensing the response comprises sensing the response of formations under each of the scar zones.

UNITED STATES PATENT AND TRADEMARK OFFICE
CERTIFICATE OF CORRECTION

PATENT NO. : 4,079,353
DATED : March 14, 1978
INVENTOR(S) : William David Jenkinson It is certified that error appears in the above—identified patent and that said Letters Patent are hereby corrected as shown below:

Col., 6, line 34, between "floor" and "of transmit-" please insert -- capable --.

Signed and Sealed this

Twenty-seventh Day of April 1982

[SEAL]

Attest:

GERALD J. MOSSINGHOFF

Attesting Officer     Commissioner of Patents and Trademarks